(12) United States Patent
Jung et al.

(10) Patent No.: US 8,295,165 B2
(45) Date of Patent: Oct. 23, 2012

(54) APPARATUS AND METHOD FOR HANDLING RADIO LINK FAILURE IN WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 275 days.

(21) Appl. No.: 12/840,892

(22) Filed: Jul. 21, 2010

(65) Prior Publication Data

US 2011/0019532 A1 Jan. 27, 2011

Related U.S. Application Data

(60) Provisional application No. 61/228,949, filed on Jul. 27, 2009.

(51) Int. Cl.
*H04L 12/26* (2006.01)
*H04W 4/00* (2009.01)
*H04W 24/00* (2009.01)

(52) U.S. Cl. .......................... 370/225; 370/332; 455/423
(58) Field of Classification Search .................. None
See application file for complete search history.

(56) References Cited

U.S. PATENT DOCUMENTS

2011/0080825 A1* 4/2011 Dimou et al. ................. 370/216
2011/0217973 A1* 9/2011 Sagfors et al. ................ 455/423
2011/0242970 A1* 10/2011 Prakash et al. ............... 370/225

* cited by examiner

*Primary Examiner* — Clemence Han
(74) *Attorney, Agent, or Firm* — McKenna Long & Aldridge LLP

(57) ABSTRACT

A method and apparatus of handling a radio link failure in a wireless communication system is provided. Upon detecting a radio link failure in a Radio Resource Control (RRC) connected state, a user equipment starts a radio link failure timer of which timer value is selected among at least one timer value for at least one RB. The user equipment attempts a RRC connection re-establishment while the radio link failure timer is running, and transitions to a RRC idle state when the radio link failure timer is expired.

16 Claims, 9 Drawing Sheets

APPARATUS AND METHOD FOR HANDLING RADIO LINK FAILURE IN WIRELESS COMMUNICATION SYSTEM

CROSS-REFERENCE TO RELATED APPLICATIONS

This application claims the benefit of priority of U.S. Provisional application 61/228,949 filed on Jul. 27, 2009, which is incorporated by reference in its entirety herein.

BACKGROUND OF THE INVENTION

1. Field of the Invention

The present invention relates to wireless communications, and more particularly, to a method and apparatus for handling a radio link failure in a wireless communication system.

2. Related Art $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A user equipment (UE) persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is currently impossible, the UE determines the current situation as a radio link failure.

Upon detecting the radio link failure, the UE attempts to recover the radio link failure. If the UE is in a radio resource control (RRC) connected mode and the recovery is delayed, quality of service for a user may not be guaranteed.

Accordingly, there is a need for a technique for handling a radio link failure in a RRC connected mode.

SUMMARY OF THE INVENTION

The present invention provides a method and apparatus for handling a radio link failure in a wireless communication system when a user equipment is in a RRC connected mode.

In an aspect, a method of handling a radio link failure in a wireless communication system is provided. The method includes setting up at least one radio bearer (RB) between a user equipment and a base station, upon detecting a radio link failure in a Radio Resource Control (RRC) connected state, selecting a timer value for a radio link failure timer among at least one timer value for the at least one RB, starting the radio link failure timer with the selected timer value, attempting a RRC connection re-establishment while the radio link failure timer is running, and transitioning from the RRC connected state to a RRC idle state when the radio link failure timer is expired.

The method may further include stopping the radio link failure timer when the RRC connection re-establishment is successfully completed.

The selected timer value for the radio link failure timer may be the timer value of a RB having highest priority.

The selected timer value for the radio link failure timer may be the timer value of a RB having highest logical channel priority (LCP).

The method may further include receiving information on at least one LCP for the at least one RB from the base station.

The method may further include receiving information on the at least one timer value for the at least one RB from the base station.

The selected timer value for the radio link failure timer may be the timer value of a RB having highest prioritized bit rate (PBR).

The selected timer value for the radio link failure timer may be the largest timer value among at least one timer value for the at least one RB.

In another aspect, a wireless apparatus for handling a radio link failure in a wireless communication system is provided. The wireless apparatus includes a radio frequency (RF) unit for transmitting and receiving a radio signal, a processor operatively coupled with the RF unit and configured to set up at least one radio bearer (RB) between a user equipment and a base station, upon detecting a radio link failure in a Radio Resource Control (RRC) connected state, select a timer value for a radio link failure timer among at least one timer value for the at least one RB, start the radio link failure timer with the selected timer value, attempt a RRC connection re-establishment while the radio link failure timer is running, and transition from the RRC connected state to a RRC idle state when the radio link failure timer is expired.

DESCRIPTION OF EXEMPLARY EMBODIMENTS

Figure 1:
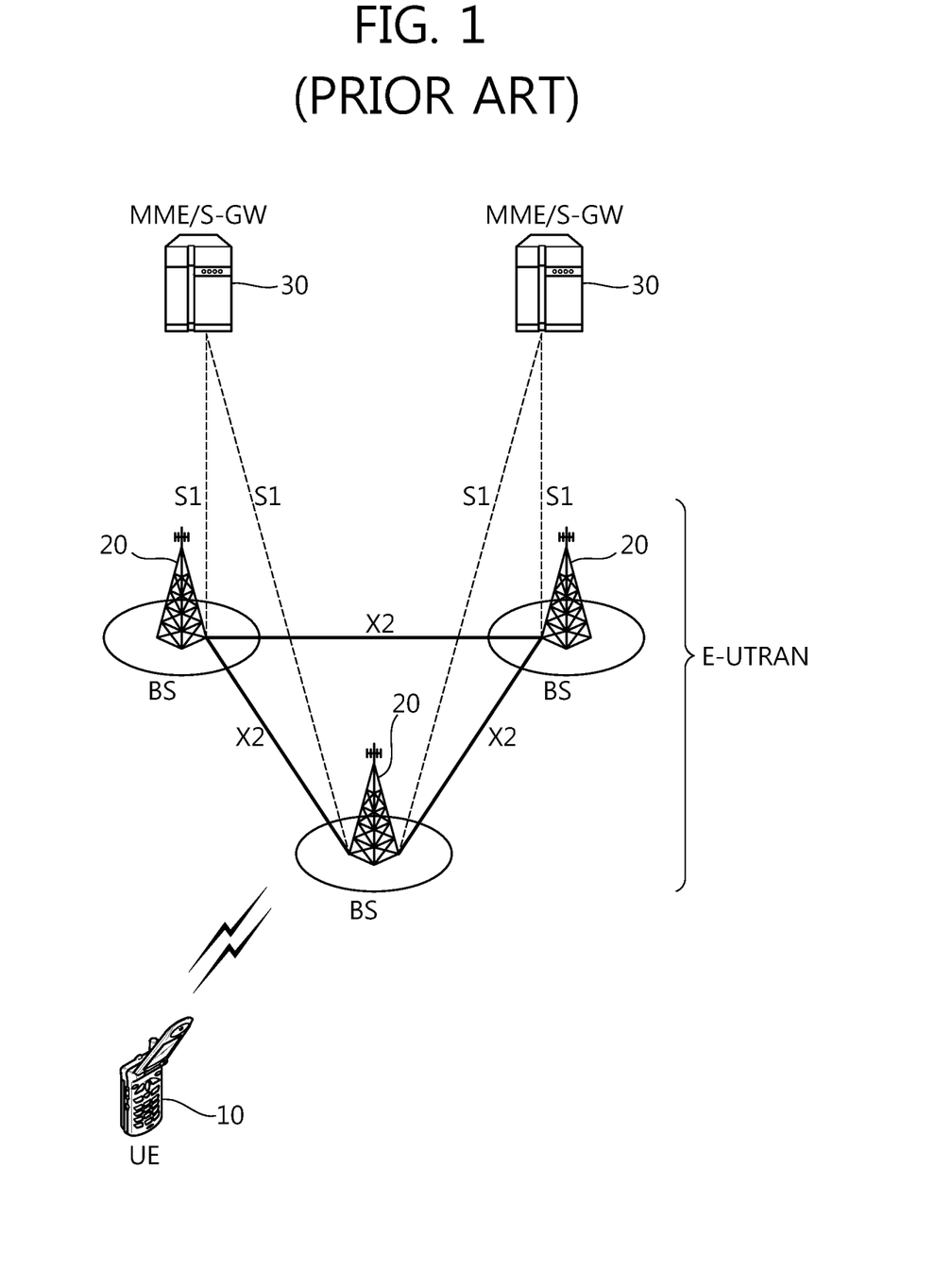
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges a RRC message between the UE and the BS.

Figure 2:
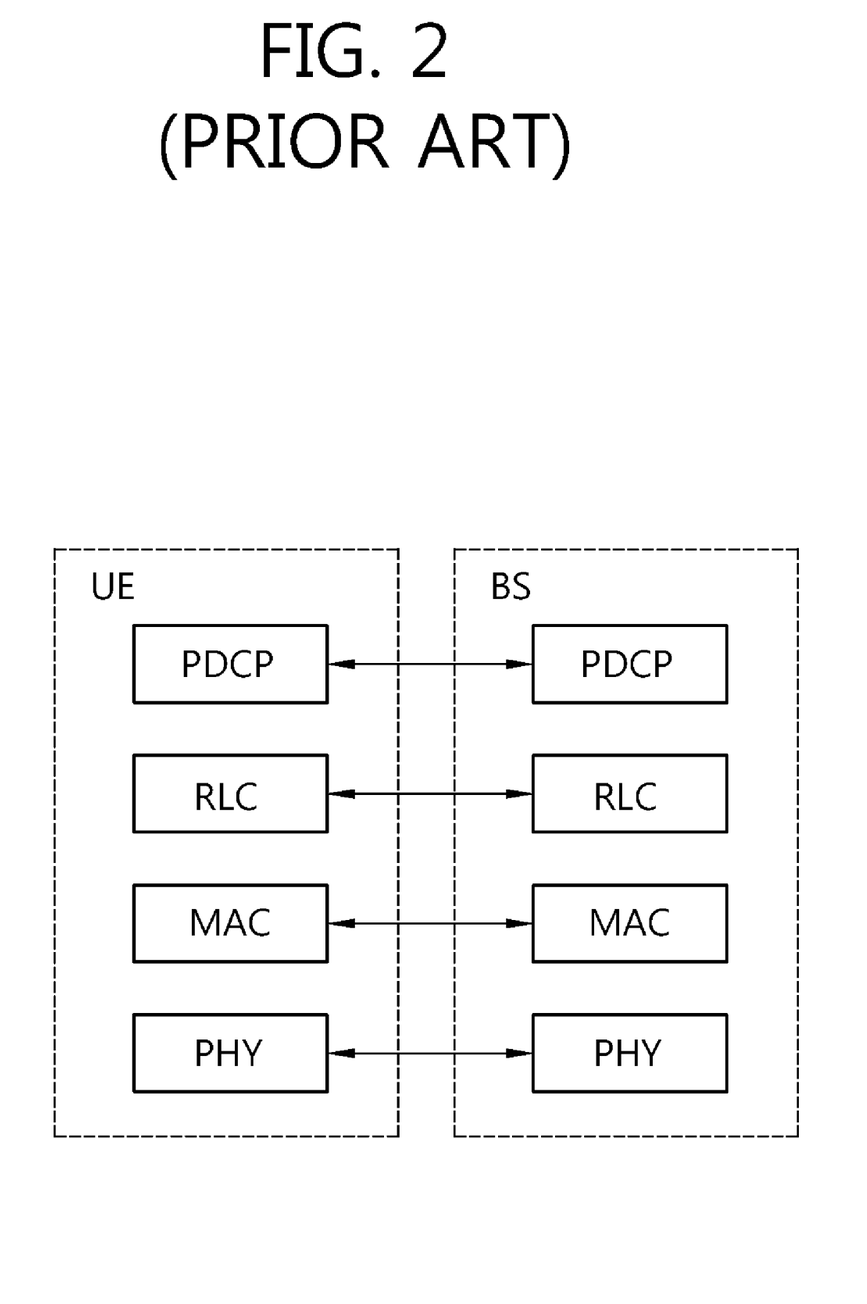
FIG. 2 is a diagram showing a radio protocol architecture for a user plane.
Figure 3:
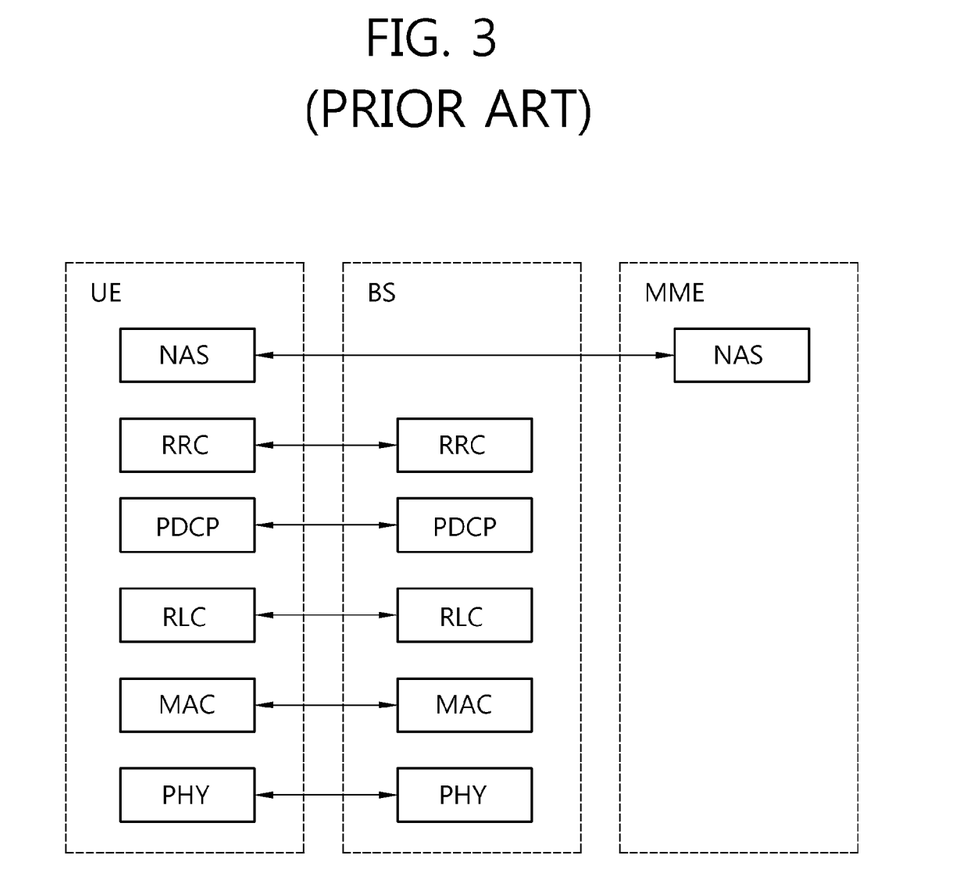
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network. The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting a RRC message in the control plane. The DRB is used as a path for transmitting user data in the user plane.

When a RRC connection exists between a RRC layer of the UE and a RRC layer of the network, the UE is in a RRC connected mode, and otherwise the UE is in a RRC idle mode.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., a L1/L2 control channel. A transmission time interval (TTI) is a unit time of data transmission, and is 1 millisecond (ms) which corresponds to one subframe.

Hereinafter, a RRC state of a UE and a RRC connection will be disclosed.

The RRC state indicates whether a RRC layer of the UE is logically connected to a RRC layer of an E-UTRAN. If the two layers are connected to each other, it is called a RRC connected state, and if the two layers are not connected to each other, it is called a RRC idle state. When in the RRC connected state, the UE has a RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish a RRC connection, the UE staying in the RRC idle state establishes the RRC connection with the E-UTRAN through a RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes a RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that must be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

Hereinafter, Logical Channel Priority (LCP) in 3GPP LTE is disclosed.

In order to provide various types of services, at least one RB may be configured. A logical channel is allocated to a RB. A plurality of logical channels corresponding to a plurality of RBs are multiplexed and transmitted through one transport channel (i.e. MAC PDU). A MAC layer can determine amounts of transmission data of the RBs by using the following rules with respect to given radio resources whenever data is transmitted.

(1) Amounts of transmission data are determined in the descending order of LCPs of the RBs. Data corresponding to the maximum prioritized bit rate (PBR) for each RB is determined as an amount of transmission data.

(2) In a case where radio resources remains, amounts of transmission data are determined in the descending order of the LCPs, again, with respect to the multiplexed RBs.

For example, when the LCPs range from 1 to 8, it is assumed that 1 is the highest priority and 8 is the lowest priority. The PBR is the minimum bit rate that is guaranteed by the RB. Even in a case where a wireless environment is very poor, a wireless communication system needs to provide the minimum bit rate.

A LCP and/or a PBR of a RB are transmitted from a RRC layer of a network to a RRC layer of an UE through a RB setup message when the RB is initially configured. The RRC layer of the UE which receives the RB setup message configures a RB and sends information on the LCP and the PBR of the RB to the MAC layer of the UE. The MAC layer that receives the information determines amounts of transmission data of the RB according to the aforementioned rules with respect to given radio resources for each transmission time interval (TTI). The TTI is referred to as an interval to transmit data through one transport channel.

Figure 4:
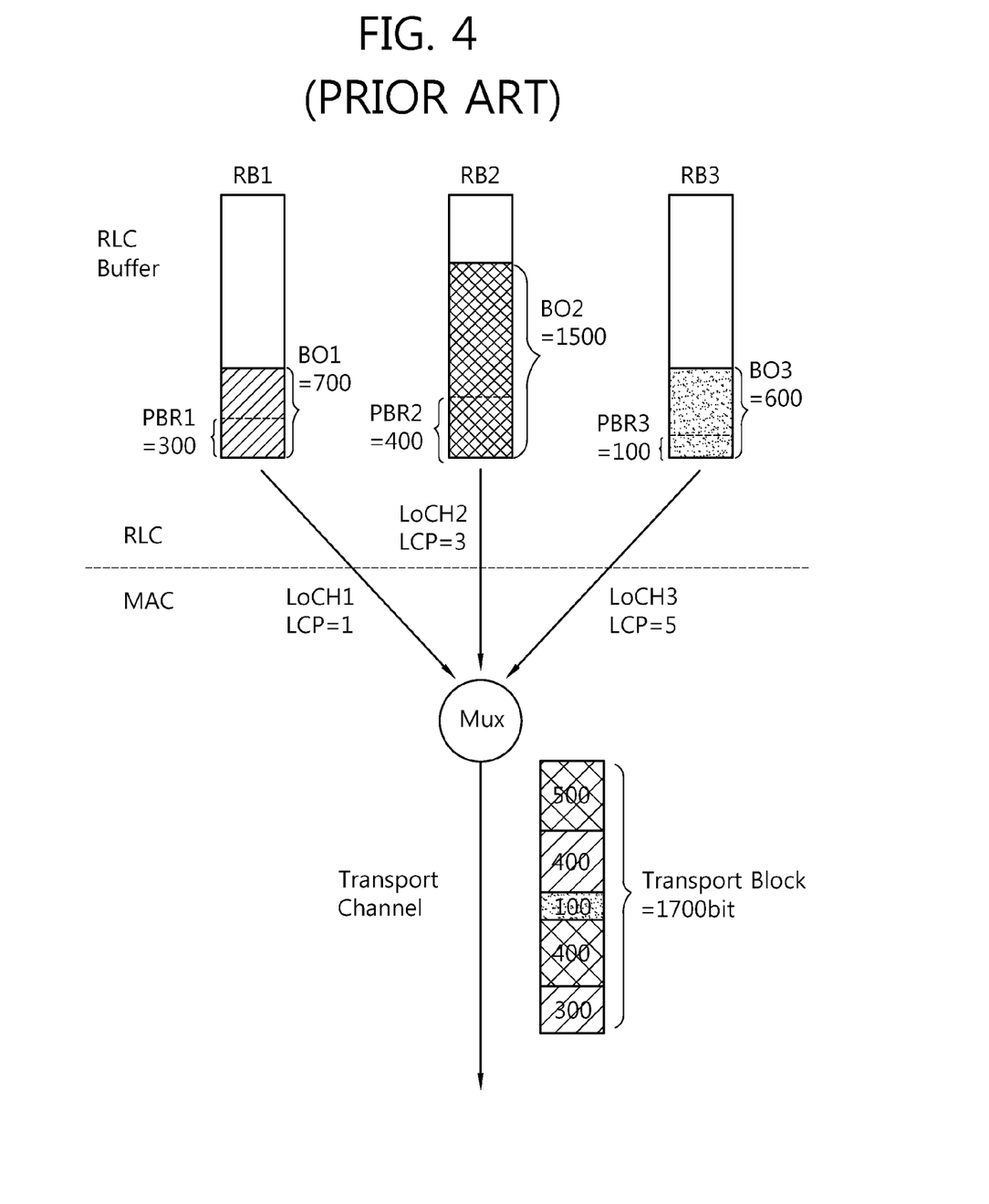
FIG. 4 illustrates an example of determining amount of transmission data using LCP.

FIG. 4 illustrates an example of determining amount of transmission data using LCP.

Three RBs RB1 to RB3 are multiplexed in one transport channel. Here, it is assumed that LCP1 of the RB1 is 1, LCP2 of the RB2 is 3, LCP3 of the RB3 is 5, BR1 of the RB1 is 300 bit/TTI, PBR2 of the RB2 is 400 bit/TTI, and PBR3 of the RB3 is 100 bit/TTI. The size of a transport block that is allocated to a transport channel is 1700 bits. The size of the transport block is the size of radio resources allocated to the transport channel and may vary for each TTI according to channel condition.

A buffer occupancy BO1 of the RB1 is 700 bits, a buffer occupancy BO2 of the RB2 is 1500 bits, and a buffer occupancy BO3 of the RB3 is 600 bits. A buffer occupancy (BO) is an amount of a buffer currently occupied by data. The occupied data can be divided into data corresponding to the PBR and the other data. Hereinafter, the data corresponding to the PBR among BOs of the RBs is called as PBR data and the other data is called as remaining data.

First, the MAC layer fills the transport block with the PBR data of RBs in the descending order of the LCPs with respect to given radio resources to the extent of the maximum PBR. In the example of FIG. 4, the LCP1 of the RB1 is the highest, the LCP2 of the RB2 is the next highest, and the LCP3 of the RB3 is the lowest. Thus, amounts of transmission data are determined in the order of RB1, RB2 and RB3, to the extent of the PBR. That is, the transport block is filled with 800 bits of PBR data in the order of the PBR1 of the RB1 of 300 bits, the PBR2 of the RB2 of 400 bits, and the PBR3 of the RB3 of 100 bits.

Next, in a case where radio resources remain in the transport block, the transport block is filled with the remaining data of the RBs in the descending order of the LCPs. In the example of FIG. 4, since the amount of the data of the RBs is filled according to the PBRs is 800 bits with respect to the transport block of the 1700 bits, extra resources of 900 bits remain. Accordingly, the transport block is filled with remaining data in the descending order of the LCPs. That is, all the remaining data of 400 bits of the RB1 having the highest LCP are firstly filled. Then, remaining data of the RB2 is filled with extra resources of 500 bits.

Finally, in this TTI, the determined amounts of transmission data of the RBs are RB1=700 bits, RB2=900 bits, and RB3=100 bits. The determined transmission data is carried by the one transport block.

The order of filling the transport block with data of RBs in the transport block depends on an embodied method.

Next, a RRC connection re-establishment procedure will be disclosed.

When a UE cannot perform normal communication due to a reason such as wireless channel quality deterioration, configuration difference between the UE and a network, etc., the UE determines that a current communication link has a trouble and thus initiates the RRC connection re-establishment procedure.

The UE may initiate the RRC connection re-establishment procedure when one of the following conditions is met: 1) When it is determined that downlink communication has a severe problem in quality on the basis of a radio quality measurement result of a PHY layer of the UE; 2) When it is determined that uplink transmission has a severe problem since a random access process continuously fails in a MAC layer or uplink data transmission continuously fails; 3) When it is determined that a handover fails; and 4) When a message received by the UE fails to pass integrity check.

Figure 5:
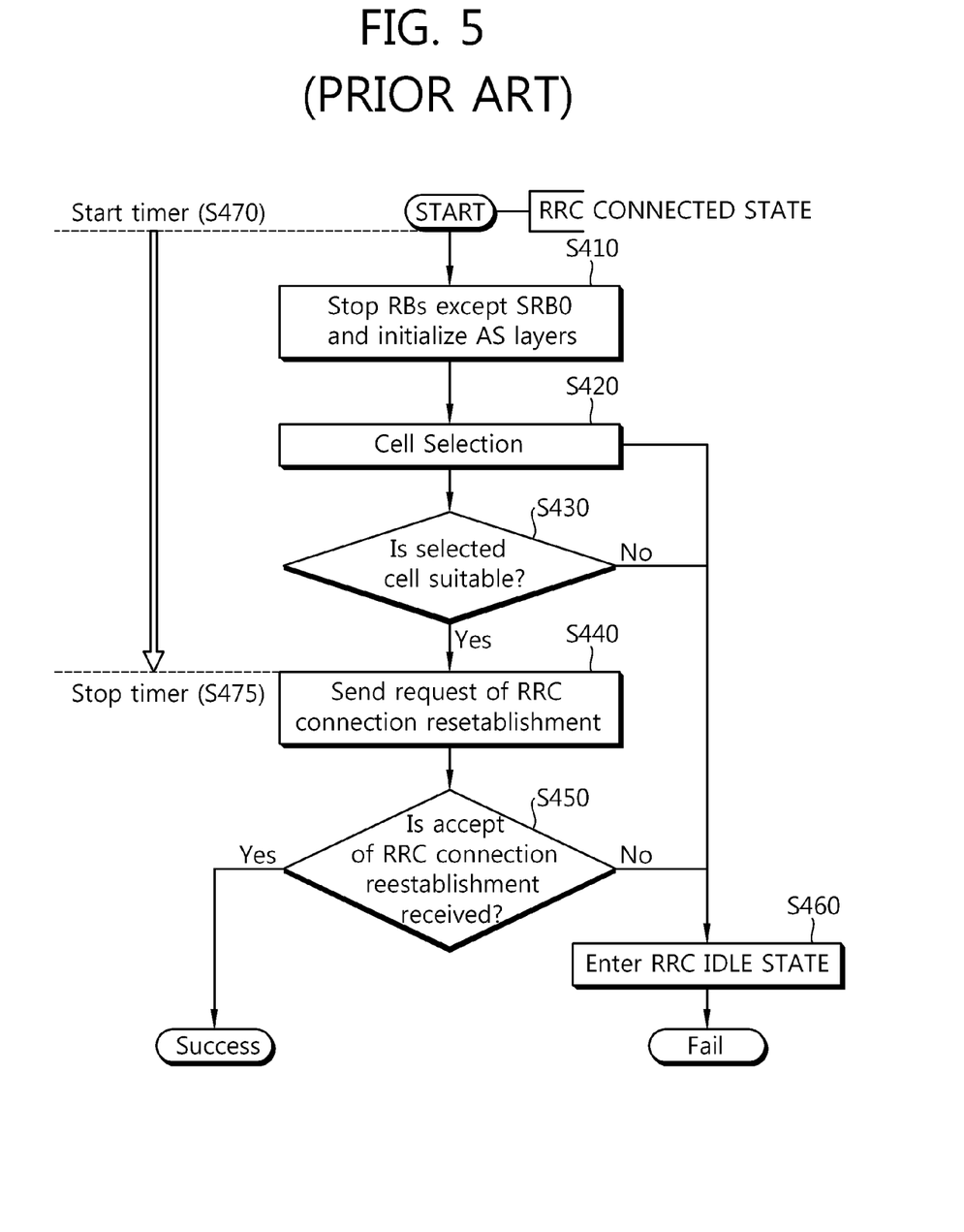
FIG. 5 is a flow chart showing a RRC connection re-establishment procedure.

FIG. 5 is a flowchart showing a RRC connection re-establishment procedure.

Upon detecting a radio link failure in a RRC connection state, a UE suspends the use of all configured RBs except for an SRB 0, initializes a variety of sub-layers of an access stratum (AS), and initializes each sub-layer and PHY layer to a default configuration (step S410). The UE remains in the RRC connection state.

The UE performs a cell selection process (step S420). This is the same as a cell selection process performed by the UE in a RRC idle state.

After performing the cell selection process, the UE reads system information of a selected cell to determine whether the selected cell is a proper cell (step S430).

If it is determined that the selected cell is a proper E-UTRAN cell, the UE sends a RRC connection re-establishment request message to a corresponding cell (step S440).

If it is determined that the selected cell is a cell using another radio access technology (RAT) other than the E-URTAN, the RRC connection re-establishment procedure is suspended, and the UE enters the RRC idle state (step S460).

Determination on whether the selected cell is the proper cell by using the system information of the selected cell is preferably finished within a limited time. The UE starts a timer at the same time of initiating the RRC connection re-establishment procedure (step S470). If the UE determines that the proper cell is selected, the timer is stop (step S475). If the timer expires, the UE determines that the RRC connection re-establishment procedure fails, and enters the RRC idle state.

If the cell accepts the RRC connection re-establishment request of the UE, the cell sends an acceptance of RRC connection re-establishment to the UE (step S450). If the UE receives the acceptance of the RRC connection re-establishment, the UE reconfigures a PDCP layer and a RLC layer with respect to an SRB 1. Further, the UE recalculates various key values related to security setup, and reconfigures the PDCP layer serving for security to newly calculated security key values. Accordingly, the SRB 1 between the UE and the cell is open, and the RRC message can be exchanged. The UE completes the restart of the SRB 1, and transmits a RRC connection re-establishment complete message to the cell to indicate that the RRC connection re-establishment procedure is complete.

Figure 6:
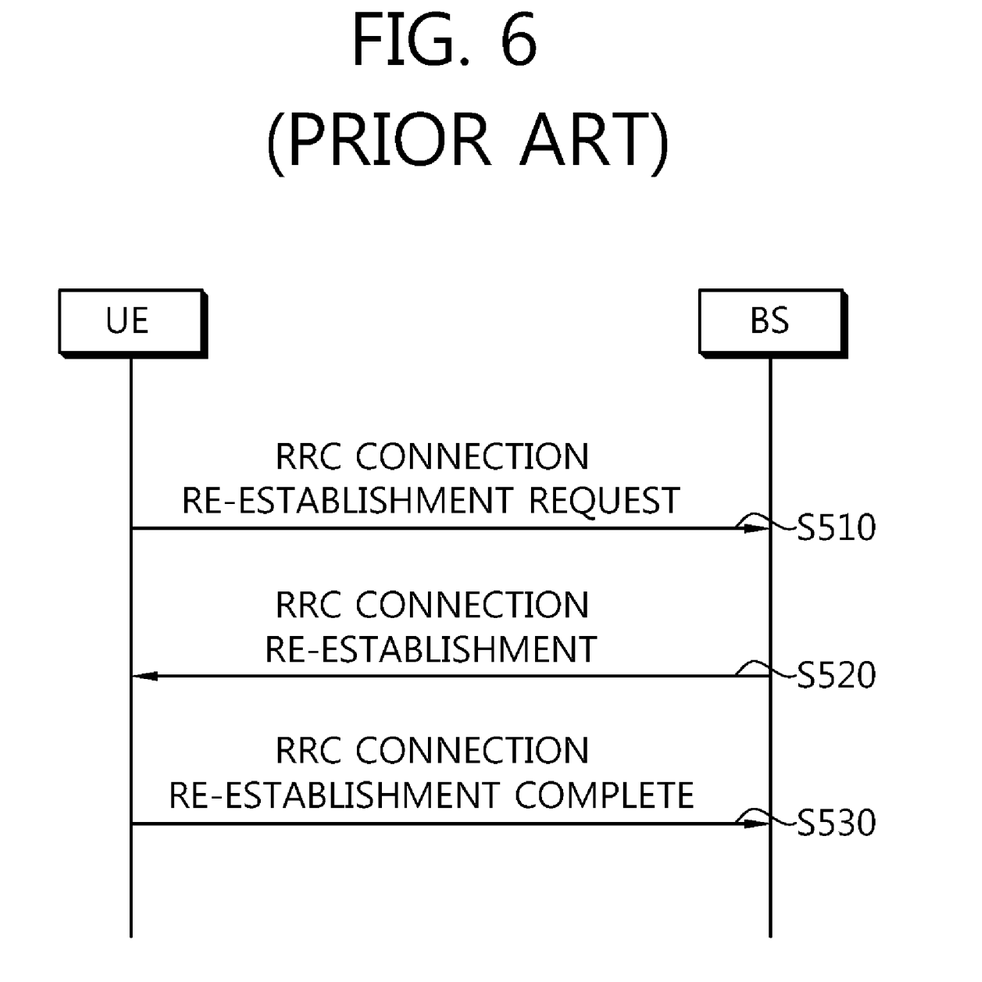
FIG. 6 is a flowchart showing a success of a RRC connection re-establishment procedure.

FIG. 6 is a flowchart showing a success of a RRC connection re-establishment procedure.

A UE selects a cell by performing cell selection. The UE receives system information to receive basic parameters for cell access from the selected cell. Then, the UE sends a RRC connection re-establishment request message to a BS (step S510).

If the selected cell is a cell having a context of the UE, i.e., if the selected cell is a prepared cell, the BS accepts the RRC connection re-establishment request of the UE, and sends a RRC connection re-establishment message to the UE (step S520). The UE sends a RRC connection re-establishment complete message to the BS and thus the RRC connection re-establishment procedure can be successful (step S530).

When the RRC connection re-establishment procedure is successful, a RRC connection reconfiguration process is performed between the cell and the UE. Thus, a current state is restored to a state before the RRC connection re-establishment procedure of the UE is performed, and service continuity can be ensured to the maximum extent possible.

Figure 7:
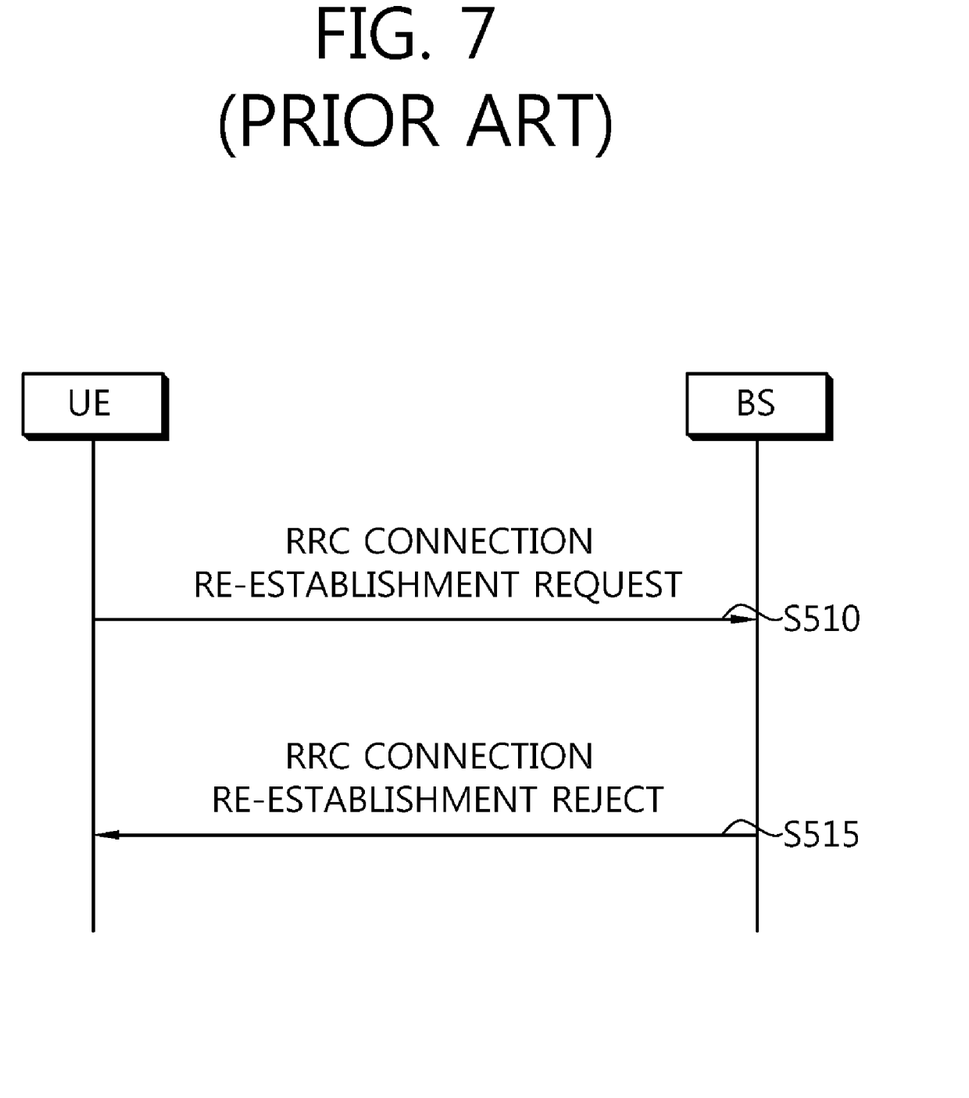
FIG. 7 is a flowchart showing a failure of a RRC connection re-establishment procedure.

FIG. 7 is a flowchart showing a failure of a RRC connection re-establishment procedure. A UE sends a RRC connection re-establishment request message to a BS (step S510). If a selected cell is not a prepared cell, the BS sends a RRC connection re-establishment reject message to the UE as a response for the RRC connection re-establishment request (step S515).

If a cell rejects the RRC connection re-establishment request of the UE, the cell transmits the RRC connection re-establishment reject message to the UE. When the UE receives the RRC connection re-establishment reject message, the UE releases a RRC connection state and transitions to a RRC idle state.

After entering the RRC idle state, the UE releases all radio resources in use (i.e., a RLC entity, a MAC configuration, a PDCP entity, etc., for all configured radio bearers), and reports to an NAS of the UE that a RRC connection is disconnected. Therefore, an AS of the UE performs initial cell selection for selecting a cell in which the UE waists in the RRC idle state.

When a radio link of the UE fails, the UE performs the RRC connection re-establishment procedure. After the RRC connection re-establishment procedure is initiated, the use of a RB is suspended until the RRC connection re-establishment procedure is complete, and thus a service provided using the RB is also suspended.

However, even if the UE cannot receive a service during the RRC connection re-establishment procedure is carried out, the BS cannot know this situation. As a result, if the UE receives a service for which accounting is achieved according to a service usage time such as a voice over Internet protocol (VoIP), a problem arises in that the BS imposes a fee even on a time in which the UE is unable to receive the service.

Figure 8:
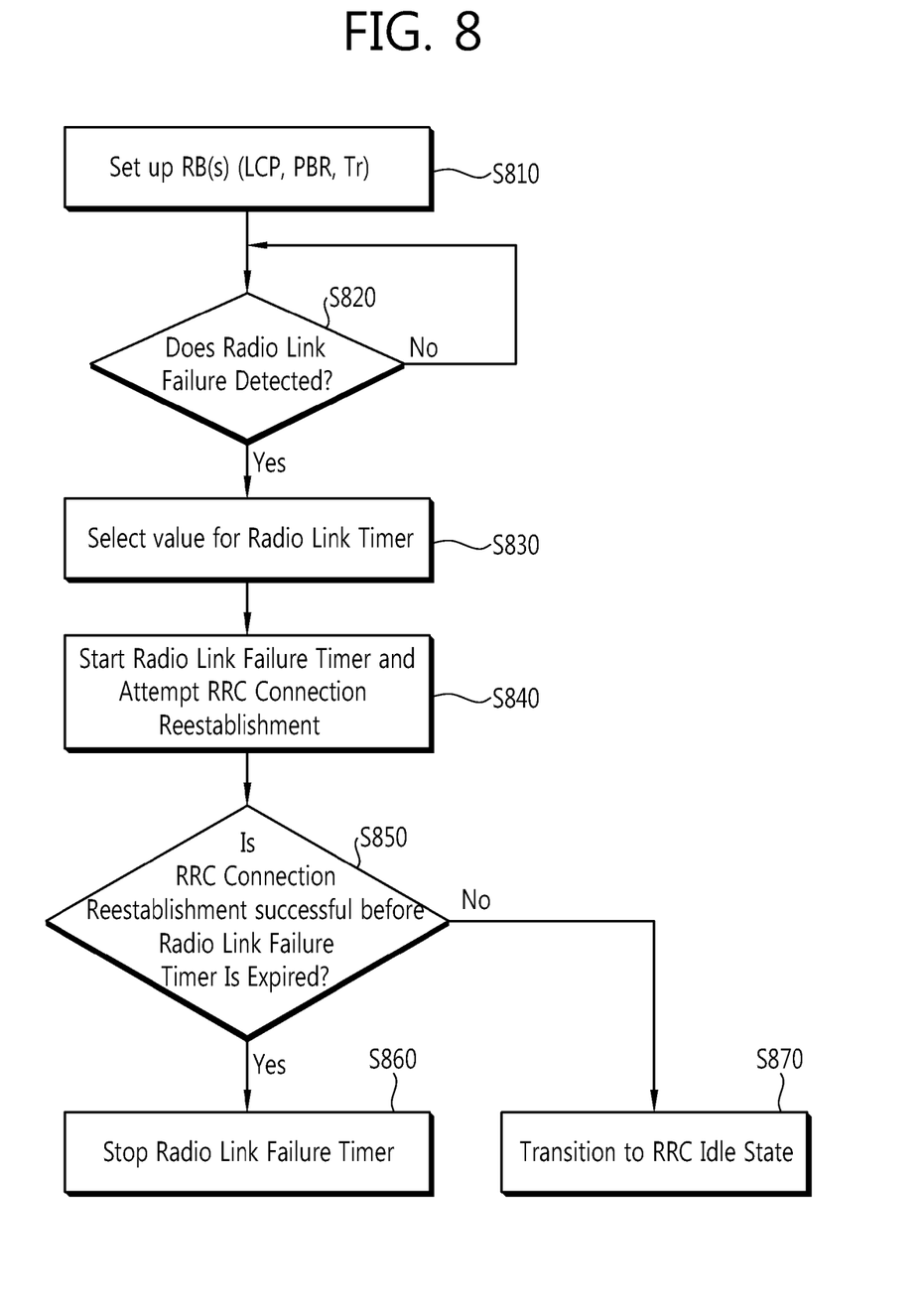
FIG. 8 is a flowchart showing a method of handling a radio link failure according to an embodiment of the present invention.

FIG. 8 is a flowchart showing a method of handling a radio link failure according to an embodiment of the present invention.

A UE and a BS set up a RB(s) (step S810). Herein, the setup of the RB includes not only a setup of a new RB but also a change of a pre-determined RB configuration.

The BS can report a priority of the configured RB (or a logical channel mapped to the RB), a PBR, and a timer value Tr to the UE. For example, logical channel configuration information for setting up a logical channel corresponding to the RB can be expressed by Table 1 below.

TABLE 1

```
Logical Channel Configuration = {
  LCP,
  PBR,
  Tr,
}
```

A LCP denotes a priority of the logical channel, the PBR denotes a PBR of the logical channel, and Tr denotes a timer value for the logical channel.

If the timer value Tr is not given, the timer value Tr can be set to a predefined value with respect to a corresponding RB (or logical channel). The predefined value may be predefined between the BS and the UE, or may be reported by the BS to the UE.

The priority for the RB, the PBR, and the timber value Tr can be transmitted by using respective separate messages (i.e., RRC connection reconfiguration messages), and can be reported by the BS to the UE at the same time of RB configuration or after RB configuration.

In the RRC connection state, the UE detects a radio link failure (step S820).

If the radio link failure is detected, a timer value for a radio link failure timer is selected from timer values of RBs (step S830). Which RB's timer value will be selected as the radio link timer value can be indicated by the BS to the UE. Alternatively, the radio link timer value can be selected based on the RB configuration and a logical channel mapped to the RB.

The radio link timer value may be selected when RBs are configured. After the RBs are configured, the UE may select the radio link timer value at any time.

The radio link timer value can be selected based on the LCP. The UE can select a timer value of a RB having a highest LCP among RBs as the radio link timer value. Alternatively, the UE can select a timer value of a RB having a lowest LCP among the RBs as the radio link timer value.

The radio link timer value can be selected based on the PBR. The UE can select a timer value of a RB having a highest PBR among the RBs as the radio link timer value. Alternatively, the UE can select a timer value of a RB having a lowest PBR among the RBs as the radio link timer value.

If the LCP and/or the PBR have the same number of a plurality of RBs, a highest timer value among timer values of the plurality of RBs can be selected as the radio link timer value. Alternatively, a smallest timer value among the timer values of the plurality of timer values can be selected as the radio link timer value.

If the RB used as a radio link failure timer value of a current UE is removed by the BS, the UE can select a new radio link failure timer value among timer values of the remaining RBs.

The UE starts the radio link failure timer and attempts RRC connection re-establishment (step S840). While the radio link failure timer is operating, the UE remains in the RRC connection state.

If the RRC connection re-establishment is successfully complete until the radio link failure timer expires (step S850), the radio link failure timer is stop (step S860). If the RRC connection re-establishment procedure is successful, the BS and the UE perform a RRC connection reconfiguration process, restores to a state before the RRC connection re-establishment procedure, and ensures service continuity to the maximum extent possible.

If the RRC connection re-establishment is not successfully complete before the radio link failure timer expires, the UE transitions to the RRC idle state (step S870).

The BS sets the radio link failure timer for each RB with respect to the UE. The UE selects the radio link failure timer to be used on the basis of a priority of logical channels mapped to the RB among the radio link failure timer values for each RB.

By considering a RB corresponding to a logical channel on which a high priority is given by the UE in data transmission, the UE can effectively perform the RRC connection re-establishment procedure.

Figure 9:
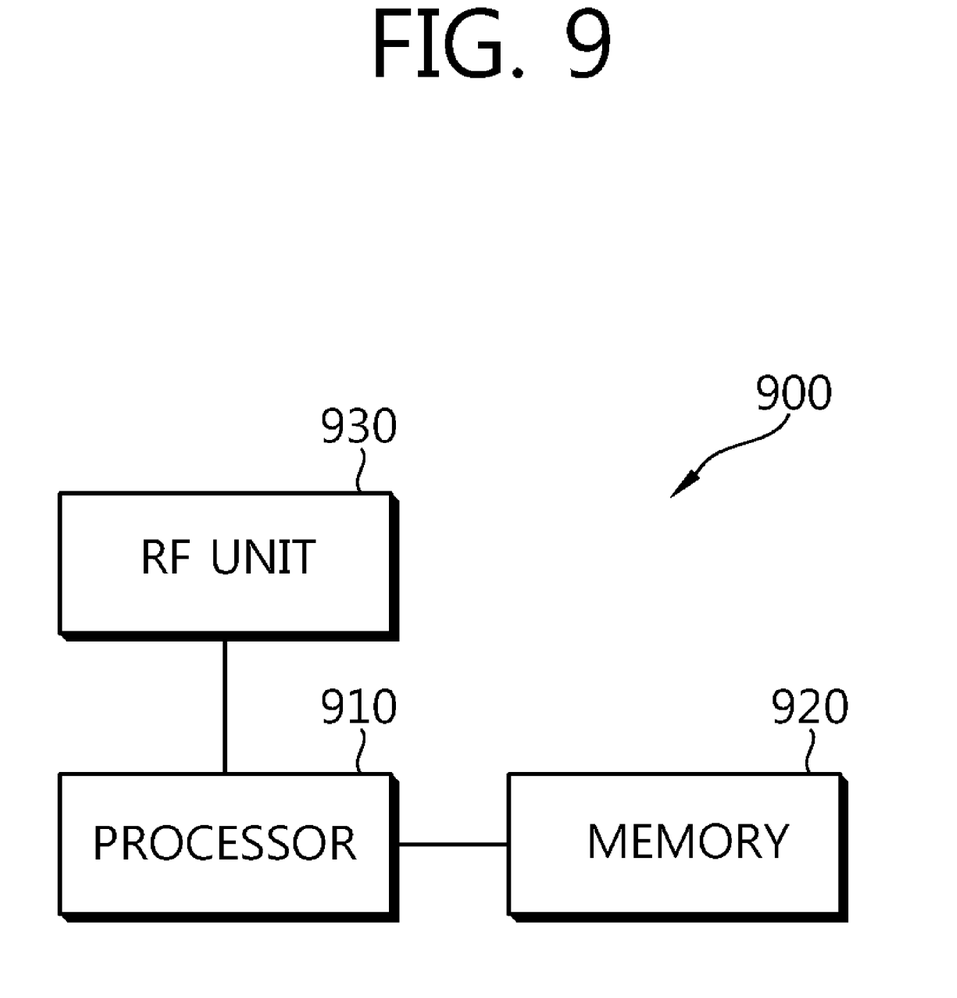
FIG. 9 is a block diagram showing a wireless apparatus to implement an embodiment of the present invention.

FIG. 9 is a block diagram showing a wireless apparatus to implement an embodiment of the present invention.

A wireless apparatus 900 may include a processor 910, a memory 92 and a RF unit 930. The memory 920 is operatively coupled with the processor 910 and stores a variety of information to operate the processor 910. The RF unit 930 is operatively coupled with the processor 910, and transmits and/or receives a radio signal.

The processor 910 may be configured to implement proposed functions, procedures and/or methods described in this description. Layers of the radio interface protocol may be implemented in the processor 910. The processor 910 may be configured to implement the operation of a user equipment in an embodiment shown in FIG. 8

The processor 910 may be configured to set up at least one RB between a user equipment and a base station. Upon detecting a radio link failure in a Radio Resource Control (RRC) connected state, The processor 910 may be configured to select a timer value for a radio link failure timer among at least one timer value for the at least one RB and start the radio link failure timer with the selected timer value. The processor 910 may be configured to attempt a RRC connection re-establishment while the radio link failure timer is running, and transition from the RRC connected state to a RRC idle state when the radio link failure timer is expired.

The processor 61 may detect a CC failure and determine whether a radio link failure is declared. The processor 61 may report the CC failure or the CC recovery to the base station.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of handling a radio link failure in a wireless communication system, the method comprising:
    setting up at least one radio bearer (RB) between a user equipment and a base station;
    upon detecting a radio link failure in a Radio Resource Control (RRC) connected state, selecting a timer value for a radio link failure timer among at least one timer value for the at least one RB;
    starting the radio link failure timer with the selected timer value;
    attempting a RRC connection re-establishment while the radio link failure timer is running; and
    transitioning from the RRC connected state to a RRC idle state when the radio link failure timer is expired.

2. The method of claim 1, further comprising:
    stopping the radio link failure timer when the RRC connection re-establishment is successfully completed.

3. The method of claim 1, wherein the selected timer value for the radio link failure timer is the timer value of a RB having highest priority.

4. The method of claim 3, wherein the selected timer value for the radio link failure timer is the timer value of a RB having highest logical channel priority (LCP).

5. The method of claim 4, further comprising:
    receiving information on at least one LCP for the at least one RB from the base station.

6. The method of claim 1, further comprising:
    receiving information on the at least one timer value for the at least one RB from the base station.

7. The method of claim 1, wherein the selected timer value for the radio link failure timer is the timer value of a RB having highest prioritized bit rate (PBR).

8. The method of claim 1, wherein the selected timer value for the radio link failure timer is the largest timer value among at least one timer value for the at least one RB.

9. A wireless apparatus for handling a radio link failure in a wireless communication system, the wireless apparatus comprising:
    a radio frequency (RF) unit for transmitting and receiving a radio signal;
    a processor operatively coupled with the RF unit and configured to:
    set up at least one radio bearer (RB) between a user equipment and a base station;
    upon detecting a radio link failure in a Radio Resource Control (RRC) connected state, select a timer value for a radio link failure timer among at least one timer value for the at least one RB;
    start the radio link failure timer with the selected timer value;
    attempt a RRC connection re-establishment while the radio link failure timer is running; and
    transition from the RRC connected state to a RRC idle state when the radio link failure timer is expired.

10. The wireless apparatus of claim 9, wherein the processor is configured to stop the radio link failure timer when the RRC connection re-establishment is successfully completed.

11. The wireless apparatus of claim 9, wherein the selected timer value for the radio link failure timer is the timer value of a RB having highest priority.

12. The wireless apparatus of claim 11, wherein the selected timer value for the radio link failure timer is the timer value of a RB having highest logical channel priority (LCP).

13. The wireless apparatus of claim 12, wherein the processor is configured to receive information on at least one LCP for the at least one RB from the base station.

14. The wireless apparatus of claim 9, wherein the processor is configured to receive information on the at least one timer value for the at least one RB from the base station.

15. The wireless apparatus of claim 9, wherein the selected timer value for the radio link failure timer is the timer value of a RB having highest prioritized bit rate (PBR).

16. The wireless apparatus of claim 9, wherein the selected timer value for the radio link failure timer is the largest timer value among at least one timer value for the at least one RB.

* * * * *